United States Patent
Lockridge et al.

(10) Patent No.: US 8,725,843 B2
(45) Date of Patent: May 13, 2014

(54) METHOD AND APPARATUS FOR ADAPTIVELY CONFIGURING A ROUTER

(75) Inventors: Terry Wayne Lockridge, Indianapolis, IN (US); John Alan Gervais, Carmel, IN (US)

(73) Assignee: Thomson Licensing, Boulogne Cedex (FR)

( * ) Notice: Subject to any disclaimer, the term of this patent is extended or adjusted under 35 U.S.C. 154(b) by 2692 days.

(21) Appl. No.: 10/223,904

(22) Filed: Aug. 20, 2002

(65) Prior Publication Data

US 2003/0101244 A1 May 29, 2003

Related U.S. Application Data

(60) Provisional application No. 60/333,872, filed on Nov. 28, 2001.

(51) Int. Cl.
*G06F 15/177* (2006.01)
*G06F 15/16* (2006.01)

(52) U.S. Cl.
USPC .......................................... 709/220; 709/228

(58) Field of Classification Search
USPC ........................ 709/220–222, 226, 238, 242
See application file for complete search history.

(56) References Cited

U.S. PATENT DOCUMENTS

| | | | | |
|---|---|---|---|---|
| 5,751,971 A | * | 5/1998 | Dobbins et al. | 709/238 |
| 6,012,088 A | * | 1/2000 | Li et al. | 709/219 |
| 6,028,846 A | | 2/2000 | Cain | 370/250 |
| 6,178,455 B1 | * | 1/2001 | Schutte et al. | 709/228 |
| 6,289,377 B1 | | 9/2001 | Lalwaney et al. | 709/222 |
| 6,295,276 B1 | | 9/2001 | Datta et al. | 370/218 |
| 6,378,005 B1 | | 4/2002 | Hyder et al. | 709/321 |
| 6,393,494 B1 | | 5/2002 | Hyder et al. | 709/321 |

OTHER PUBLICATIONS

Mogul, Internet Standard Subnetting Procedure, Aug. 1985, IETF, RFC 950, p. 8.*
Droms (RFC 1541, Oct. 1993) Dynamic Host Configuration Protocol, pp. 4, 8 and 39.*

* cited by examiner

*Primary Examiner* — Peling Shaw
(74) *Attorney, Agent, or Firm* — Robert D. Shedd; Paul P. Kiel; Guy H. Eriksen

(57) ABSTRACT

A method, device, and computer readable medium for adaptively configuring a router in a communication system having a plurality of network devices. Data packets passing through the router are examined in order to determine network parameters associated with the plurality of network devices. A plurality of network interfaces in the router are then adapted to the network parameters so that the router is operatively coupled to the plurality of network devices.

26 Claims, 3 Drawing Sheets

METHOD AND APPARATUS FOR ADAPTIVELY CONFIGURING A ROUTER

CROSS-REFERENCE TO RELATED APPLICATIONS

This application claims benefit of U.S. provisional patent application Ser. No. 60/333,872, filed Nov. 28, 2001, which is incorporated herein by reference in its entirety.

FIELD OF THE INVENTION

The present invention generally relates to communication systems and, more particularly, to a method and apparatus for adaptively configuring a networked communication device.

BACKGROUND OF THE INVENTION

Purchasers of routers for networking computers in a home, small office, or distribution center, for example, frequently return the routers after purchase. The reason for the high-return rate is that many customers/users/purchasers are not network savvy and cannot get the router configured properly. This problem commonly occurs when the customer is attempting to network existing personal computers (PCs) together through a broadband modem using a router.

For legacy equipment, and for some new broadband installations, a service provider typically sends a technician to install and connect a customer's PC to a broadband modem. Subsequently, the customer may decide to insert a router to network their PCs and/or add firewall, for example. These must be properly configured. Many customers try to configure the router, fail to do so, and then return the router after the configuration failure. This creates a high product return rate due to the difficulty of installation.

SUMMARY OF THE INVENTION

The present invention is a method, device, and computer readable medium for adaptively configuring a router in a communication system having a plurality of network devices. Specifically, the present invention examines data packets passing through the router in order to determine network parameters associated with the plurality of network devices. The present invention then adapts a plurality of network interfaces in the router to the network parameters so that the router is operatively coupled to the plurality of network devices.

BRIEF DESCRIPTION OF THE DRAWINGS

So that the manner in which the above recited features of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

The present invention is a method and apparatus for adaptively configuring a router in a communication system. The present invention will be described within the context of a router coupled between a home network and a broadband internet service provider (ISP). Those skilled in the art, however, will appreciate that the present invention can be advantageously employed in any communication system in which various network devices are coupled to a router. Thus, the present invention has broad applicability beyond the particular network systems described herein.

Figure 1:
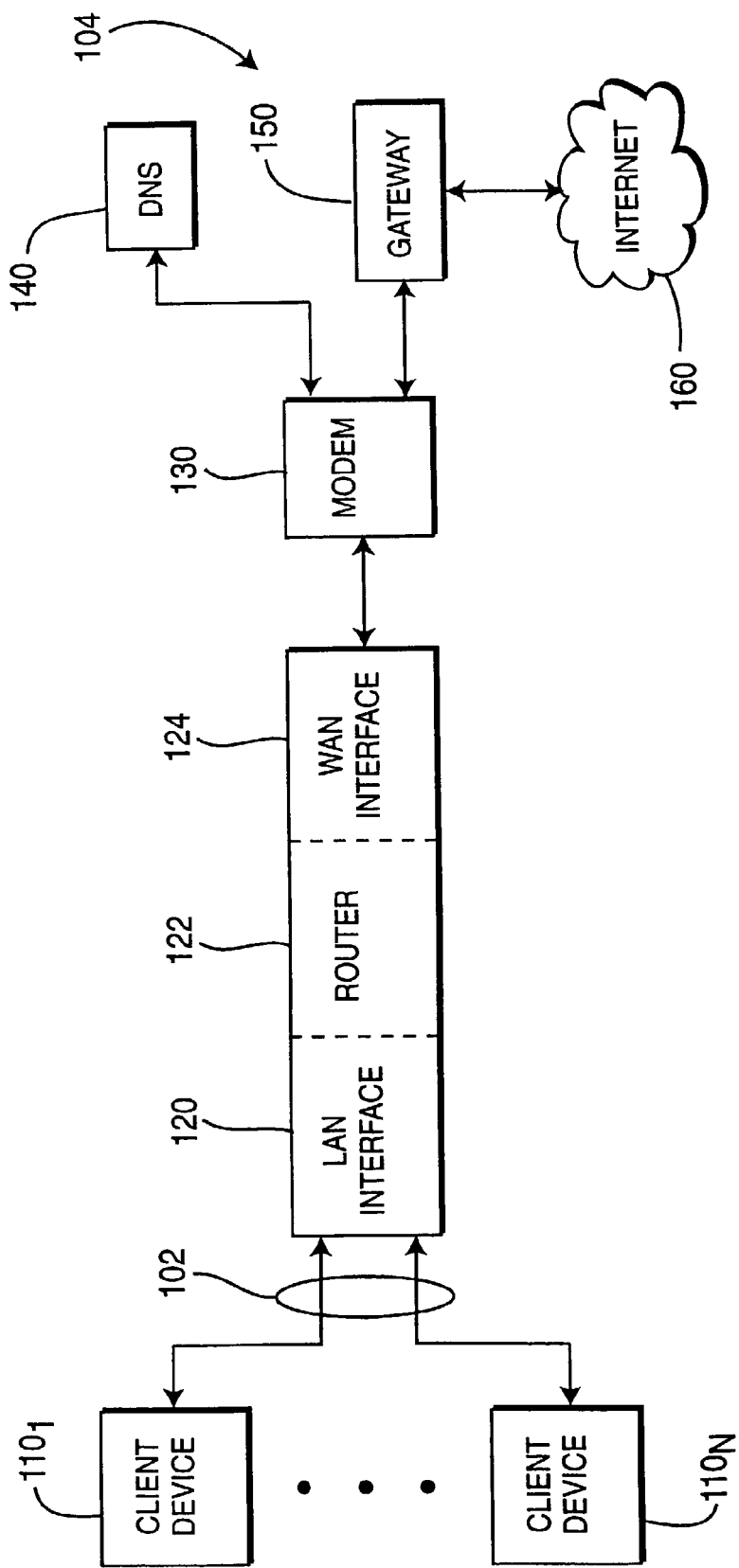
FIG. 1 depicts a high-level block diagram of an illustrative communication system suitable for use with the present invention.

FIG. 1 depicts a high-level block diagram of an illustrative communication system 100 suitable for use with the present invention. As shown, the communication system 100 comprises a local area network (LAN) 102, a router 122, a modem 130, and a wide area network (WAN) 104. The LAN 102 comprises one or more client devices $110_1$ through $110_N$ (collectively 110), where N is an integer greater than or equal to 1. The WAN 104 comprises a domain name server (DNS) 140 and a gateway server 150. Although a plurality of client devices 110 are shown, the present invention can also be used with a single client device. In addition, the composition of the WAN 104 is merely illustrative, as the WAN 104 can comprise various server devices known to those skilled in the art. The devices comprising the LAN 102 and the WAN 104 are generally referred to herein as network devices.

The router comprises a LAN interface 120 coupled to the LAN 102, and a WAN interface 124 coupled to the WAN 104. The LAN interface 120 comprises several physical ports for connection to the client devices 110, whereas the WAN interface 124 comprises a physical port for connection to the modem 130. The modem 130 comprises a cable modem, a digital subscriber line (DSL) modem, or like type broadband modem known to those skilled in the art. While not preferred, the modem 130 may also comprise a narrowband device, such as a dial-up modem. Briefly stated, the router 122 provides an interface between the client devices 110 and another network 160, such as the Internet, through the modem 130 and the gateway server 150. In order to operatively couple the router 122 between the LAN 102 and the WAN 104, the LAN interface 120 and the WAN interface 124 are configured with network parameters associated with the LAN 102 and the WAN 104, respectively.

In accordance with the present invention, the router 122 adapts the LAN interface 120 and the WAN interface 124 to the LAN 102 and WAN 104 network parameters by monitoring network traffic passing through the router 122 and responsively adapting router operation. The router 122 can, if necessary, request all network parameters required for auto-configuration. The router 122 can then, without user intervention, assume network parameters associated with a network device as viewed from the WAN 104 (e.g., client device $110_1$), and assume network parameters associated with a network device as viewed from the LAN 102 (e.g., gateway server 150).

Exemplary network parameters include internet protocol (IP) addresses and medium access control (MAC) addresses associated with the client devices 110, a subnet mask associated with the LAN 102, a domain name and a host name associated with the client devices 110, a gateway IP address associated with the gateway server 150, and one or more DNS IP addresses associated with the DNS 140. The present invention allows the router 122 to function in a variety of network environments, since network settings vary from ISP to ISP, and LAN 102 configurations also vary from user to user. For example, some ISPs run a dynamic host configuration protocol (DHCP) server in conjunction with the gateway server 150 for providing network settings to the client devices 110 dynamically. In other cases, ISPs do not employ such a DHCP server, and the client devices 110 are manually configured using static network settings. The present invention advantageously obviates the need for a user to manually configure the router, and/or to manually change the network settings of the network devices in the LAN 102 and the WAN 104 regardless of the configuration of the LAN 102 and the WAN 104.

Figure 2:
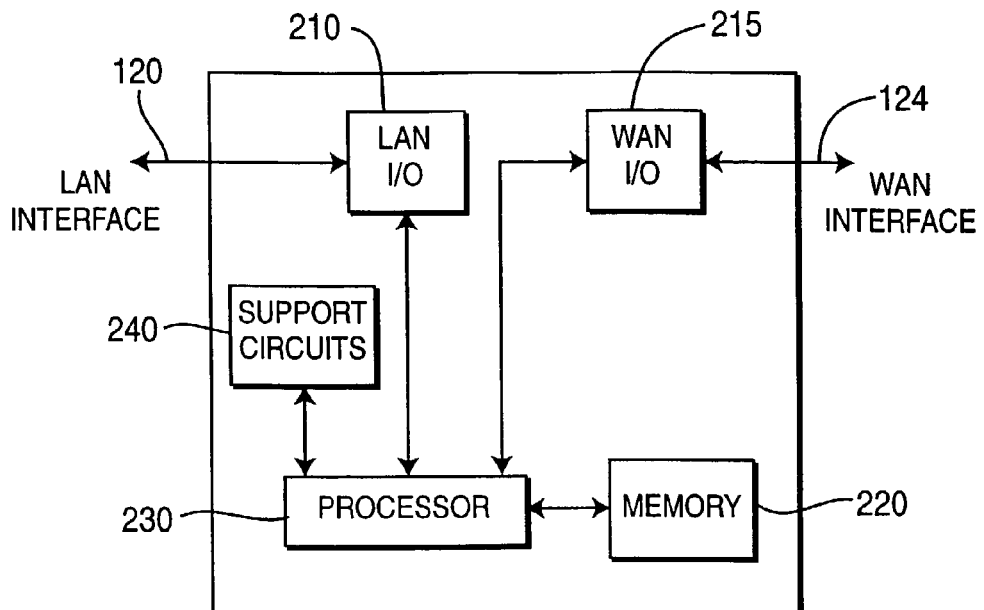
FIG. 2 depicts a high-level block diagram showing one embodiment of a router suitable for use with the present invention.

FIG. 2 depicts a high-level block diagram showing one embodiment of a router 122 suitable for use with the present invention. The router 122 comprises a processor 230 as well as a memory 220 for storing information, such as software routines for executing a method of adaptively configuring the router 122. The processor 230 cooperates with conventional support circuitry 240, such as power supplies, clock circuits, cache memory, and the like, as well as circuits that assist in executing the software routines stored in the memory 220. Of course, some of the process steps discussed herein as software processes can be implemented within hardware, for example, circuitry that cooperates with the processor 230 to perform various steps. The router 122 also includes LAN input/output (I/O) circuitry 210 and WAN I/O circuitry 215 that forms an interface between the various functional elements communicating with the router 122. For example, in the embodiment of FIG. 1, the router 122 communicates with the client devices 110 of the LAN 102 as well as the server devices of the WAN 104 (e.g., the gateway server 150 and the DNS 140).

Although the router 122 of FIG. 2 depicts a general-purpose processor 230 that is programmed to perform various control functions in accordance with the present invention, the invention can be implemented in hardware, for example, as an application specific integrated circuit (ASIC). As such, the process steps described herein are intended to be broadly interpreted as being equivalently performed by software, hardware, or a combination thereof.

Figure 3:
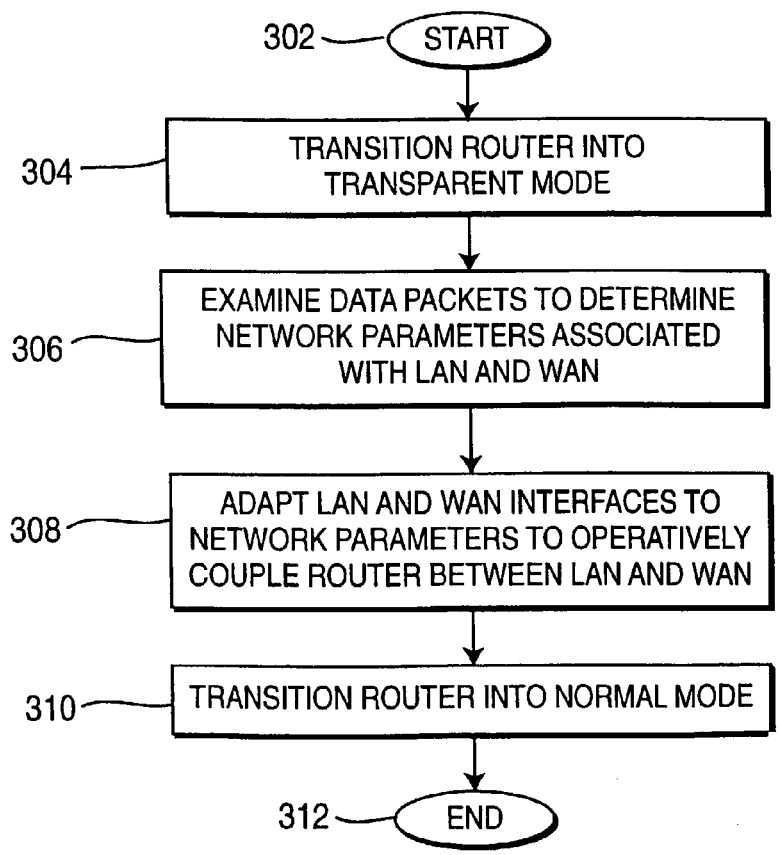
FIG. 3 depicts a high-level flow diagram showing one embodiment of a method for adaptively configuring a router in accordance with the present invention.

FIG. 3 depicts a high-level flow diagram showing one embodiment of a method 300 for adaptively configuring a router in a communication system. As shown, the method 300 is entered at step 302 and proceeds to step 304, where the router 122 transitions into transparent mode in which data packets transparently pass through the router 122 from the LAN 102 to the WAN 104. That is, the router 122 does not perform any processing functions that would require the router to be configured, such as routing the data packets. In one embodiment, the router 122 has a user interface that allows a user to take the router 122 out of transparent mode and into normal mode so that the user can configure the router 122 manually. At step 306, the router 122 examines the data packets transparently passing therethrough to determine network parameters associated with the LAN 102 and the WAN 104. The network parameters are of a type that are necessary for the router to be operatively coupled between the LAN 102 and the WAN 104 when the router is in normal routing mode. At step 308, the router 122 adapts the LAN interface 120 and the WAN interface 124 to the network parameters to opera-tively couple the router 122 between the LAN 102 and the WAN 104. At step 310, the router 122 transitions into normal routing mode. The switch is transparent to the user. The client devices 110 in the LAN 102 are fully functional, and the router 122 is now controlling the LAN 102 providing routing, firewalling, filtering, and like type functions known in the art. The method 300 ends at step 312.

Figure 4:
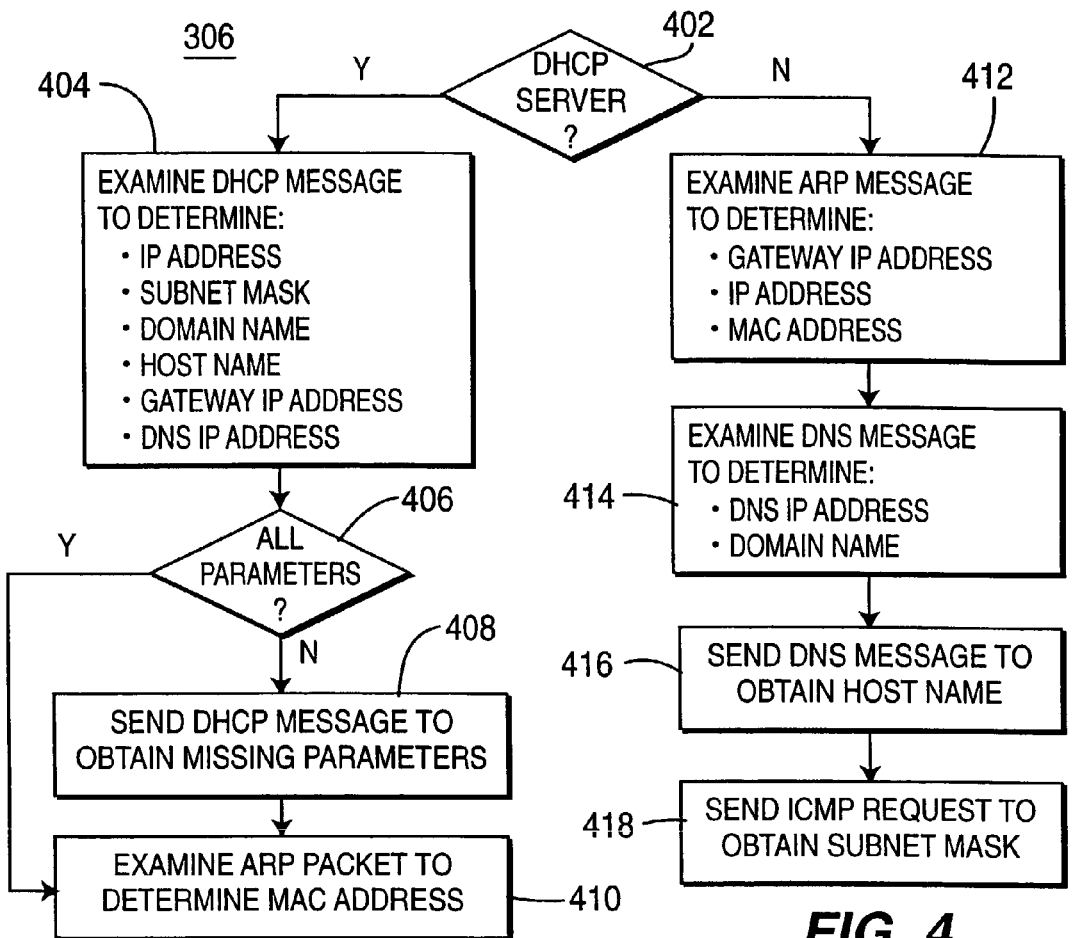
FIG. 4 depicts a more detailed flow diagram showing one embodiment of a network parameter determination step of the method shown in FIG. 3.

FIG. 4 depicts a more detailed flow diagram showing one embodiment of the examining step 306. At step 402, the router 122 determines whether or not the WAN 104 includes a DHCP server associated with the gateway server 150. This may require a reboot of a client device 110 to cause a DHCP DISCOVER packet to be sent to the DHCP server associated with the gateway server 150. If there is a DHCP server in the WAN 104, the method proceeds to step 404. Otherwise, the method proceeds to step 412.

At step 404, the router 122 examines DHCP messages passing between the LAN 102 and the WAN 104 to determine, to the extent possible, the assigned IP address, the subnet mask for the LAN 102, the domain and host names for the client devices 110 of the LAN 102, the gateway IP address for the gateway server 150, and one or more DNS IP addresses for the DNS 140. In order to force a client device 110 to send DHCP information, it may be necessary to reboot the client device. Since DHCP information is needed from only one client device $110_1$, only one client device $110_1$ must be rebooted. The network parameters of this client device $110_1$ will, by definition, become the network parameters of which the router 122 will assume at the WAN interface 124.

In addition, by examining DHCP messages, the router 122 can determine what parameters a client device 110 in the LAN 102 requested, and what parameters the DHCP server in the WAN 104 provided. The DHCP message queries from a client device 110 to a DHCP server (e.g., the gateway server 150) are internet protocol/user datagram protocol (IP/UDP) packets using port 67. The DHCP message responses from the DHCP server to a client device 110 are IP/UDP packets using port 68. The router 122 scans all network traffic and collects the IP/UDP packets on ports 67 and 68. By parsing the DHCP message response from the DHCP server, the router 122 can extract the network parameters described above.

At step 406, the router 122 determines whether all the network parameters were determined in step 404. Since DHCP is an extension of BOOTP, the information in the message may not be complete. If a scanned DHCP message response from the DHCP server (e.g., the gateway 150) does not have all the network parameters, the router 122 sends a DHCP message to obtain the missing parameters at step 408. In particular, the router 122 can generate a DHCP/BOOTP inform message type to query the DHCP to obtain the missing information.

In any case, the method proceeds to step 410, where the router 122 examines address resolution protocol (ARP) packets to determine the MAC address for a client device 110 in the LAN 102. ARP packets contain a source MAC address, source IP address, destination IP address, and a broadcast MAC address. The router 122 scans for ARP packets having the IP address previously determined in step 404. Once such an ARP packet has been found, the router 122 saves the MAC address corresponding to a client device 110 in the LAN 102. The use of ARP packets to obtain the MAC address is illustrative, since all IP packets have an IP address and a MAC address.

If there is no DHCP server associated with the gateway 150 in the WAN 104, the router examines ARP messages to determine the gateway IP address, the assigned IP address, and the MAC address at step 412. In one embodiment, the router 122 scans for an ARP broadcast message, which includes a source MAC address, a source IP address, a destination IP address, and a broadcast MAC address. The ARP response to the ARP broadcast contains a source MAC address, a source IP address, a destination MAC, and a destination IP address. Thus, the router 122 can determine the MAC address for a client device 110 in the LAN 102, the assigned IP address, and the default gateway IP address from the ARP broadcast and response packets.

At step 414, the router 122 examines DNS messages to determine the DNS IP address and the domain name. The Router scans IP/TCP/UDP network packets to detect DNS messages. Part of the DNS message is the IP address for the DNS 140. The router 122 generates DNS messages to be sent to the DNS 140 to get additional information. The DNS 140 then returns with an answer, authority, and additional information packets. The router 122 extracts the domain name from the answer packet, and the additional information packets provide address for other DNS servers.

At step 416, the router 122 sends another DNS message to obtain the host name. At step 418, the router 122 sends an internet control message protocol (ICMP) request to obtain the subnet mask. In particular, the router 122 sends an ICMP address mask request to various network devices (e.g., client devices 110 or gateway 150). The ICMP address mask reply has the subnet mask.

Figure 5:
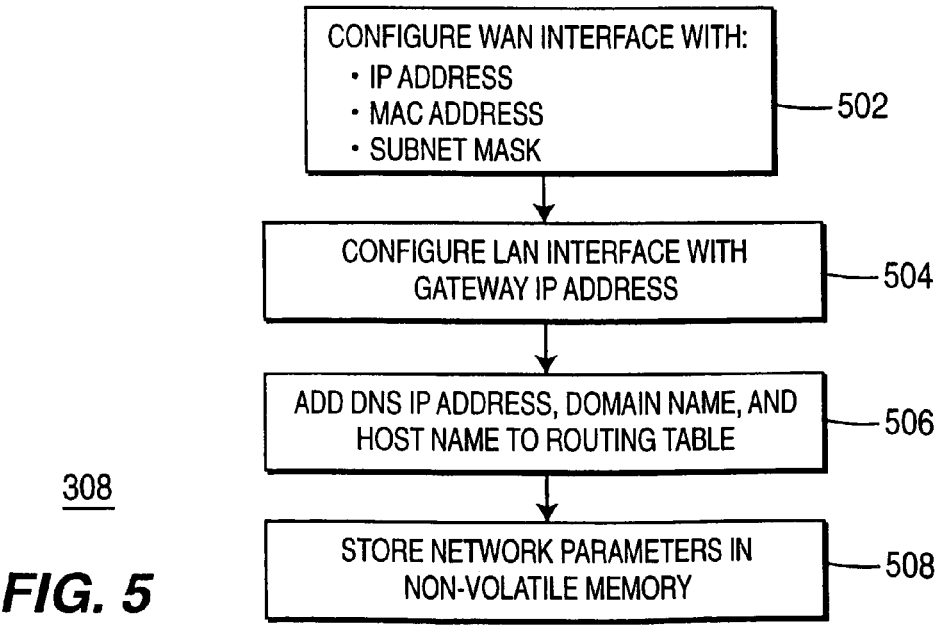
FIG. 5 depicts a more detailed block diagram showing one embodiment of a network parameter adaptation step of the method shown in FIG. 3.

FIG. 5 depicts a more detailed block diagram showing one embodiment of the adapting step 308 of the method 300 shown in FIG. 3. At step 502, the router 122 configures the WAN interface 124 with the MAC address, the IP address, and the subnet mask. That is, the router 122 configures itself to assume the identity of one of the client devices 110 in the LAN 102. At step 504, the router 122 configures the LAN interface 120 with the gateway IP address and MAC address. As such, the router 122 looks like the gateway server 150 to the client devices 110 in the LAN 102. At step 506, the DNS IP address, the domain name, and the host name are added to the routing tables within the router 122. At step 508, the network parameters are stored in non-volatile memory (e.g., memory 220). Storing the network parameters obviates the need for the router 122 to repeat the adaptive configuration methods of the present invention described above.

Those skilled in the art will appreciate that various modifications may be made to the above-described embodiments of invention, such modifications being contemplated by the inventors. For example, in one embodiment of the invention, where a user has some knowledge of the various configurations, those particular configurations can be provided to the router in the standard manner. In response, the router uses those configuration inputs to assist in identifying other operational parameters, such as described above with respect to the various figures. Thus, while the invention primarily contemplates a situation in which a user provides no information to the router, it is noted that the invention can accept user supplied information and, optionally, utilize such information to further determine appropriate operational parameters.

While the foregoing is directed to the preferred embodiment of the present invention, other and further embodiments of the invention may be devised without departing from the basic scope thereof, and the scope thereof is determined by the claims that follow.

The invention claimed is:

1. A method of configuring a router, comprising:
examining, in an un-configured non-routing-mode, data packets transparently passing through the router that are directed to one or more of a plurality of network devices other than the router for determining network parameters associated with the plurality of network devices, the network parameters being previously unknown to the router; and
adapting a plurality of network interfaces in the router to the network parameters for operatively coupling the router and the plurality of network devices.

2. The method of claim 1, further comprising:
in absence of determinable network parameters, sending a request to cause transmission to the router of information indicative of the network parameters.

3. The method of claim 1, wherein said network parameters comprise at least one parameter selected from the group consisting of an internet protocol (IP) address, a subnet mask, a domain name, a host name, a gateway address, a domain name server (DNS) address, and a medium access control (MAC) address.

4. The method of claim 1, wherein the plurality of network devices comprises at least one server device and at least one client device; and wherein the plurality of network interfaces comprises a wide area network (WAN) interface coupled to the at least one server device, and a local area network (LAN) interface coupled to the at least one client device.

5. The method of claim 4, wherein the at least one server device comprises a gateway server and a DNS server.

6. The method of claim 1, wherein the step of examining data packets comprises at least one of:
scanning the data packets for dynamic host configuration protocol (DHCP) messages;
scanning the data packets for address resolution protocol (ARP) packets; and
scanning the data packets for DNS messages.

7. The method of claim 2, wherein the step of sending a request comprises at least one of:
transmitting a DHCP message to at least one of the plurality of network devices;
transmitting a DNS message to at least one of the plurality of network devices; and
transmitting an internet control message protocol (ICMP) address mask request.

8. The method of claim 1, further comprising:
storing the network parameters in a non-volatile memory.

9. The method of claim 1, wherein said examining and adapting steps are performed by the router.

10. The method of claim 1, wherein the method comprises self-configuring the router, and said self-configuring step comprises said examining and adapting steps.

11. A network communication device, comprising:
a memory for storing network parameters and instructions; and
a processor, upon executing the instructions, configured to:
examine, in an un-configured non-routing-mode, data packets transparently passing through the network communication device that are directed to one or more of a plurality of network devices other than the network communication device for determining network parameters associated with the plurality of network devices, the network parameters being previously unknown to the network communication device; and
adapt a plurality of network interfaces in the network communication device to the network parameters for operatively coupling the network communication device and the plurality of network devices.

12. The device of claim 11, wherein the processor is further configured to:

in absence of determinable network parameters, send a request to cause transmission to the network communication device of information indicative of the network parameters.

13. The device of claim 11, wherein said network parameters comprise at least one parameter selected from the group consisting of an internet protocol (IP) address, a subnet mask, a domain name, a host name, a gateway address, a domain name server (DNS) address, and a medium access control (MAC) address.

14. The device of claim 11, wherein the plurality of network devices comprises at least one server device and at least one client device; and wherein the plurality of network interfaces comprises a wide area network (WAN) interface coupled to the at least one server device, and a local area network (LAN) interface coupled to the at least one client device.

15. The device of claim 14, wherein the at least one server device comprises a gateway server and a DNS server.

16. The device of claim 11, wherein the processor is further configured to:
scan the data packets for dynamic host configuration protocol (DHCP) messages;
scan the data packets for address resolution protocol (ARP) packets; and
scan the data packets for DNS messages.

17. The device of claim 12, wherein the processor is further configured to:
transmit a DHCP message to at least one of the plurality of network devices;
transmit a DNS message to at least one of the plurality of network devices; and
transmit an internet control message protocol (ICMP) address mask request.

18. A computer readable medium for storing a set of instructions that, when executed by a processor, cause the processor to perform a method of configuring a router, comprising:
examining, in an un-configured non-routing-mode, data packets transparently passing through the router that are directed to one or more of a plurality of network devices other than the router for determining network parameters associated with the plurality of network devices, the network parameters being previously unknown to the router; and
adapting a plurality of network interfaces in the router to the network parameters for operatively coupling the router and the plurality of network devices.

19. The computer readable medium of claim 18, further comprising:
in absence of determinable network parameters, sending a request to cause transmission to the router of information indicative of the network parameters.

20. The computer readable medium of claim 18, wherein said network parameters comprise at least one parameter selected from the group consisting of an internet protocol (IP) address, a subnet mask, a domain name, a host name, a gateway address, a domain name server (DNS) address, and a medium access control (MAC) address.

21. The computer readable medium of claim 18, wherein the plurality of network devices comprises at least one server device and at least one client device; and wherein the plurality of network interfaces comprises a wide area network (WAN) interface coupled to the at least one server device, and a local area network (LAN) interface coupled to the at least one client device.

22. The computer readable medium of claim 21, wherein the at least one server device comprises a gateway server and a DNS server.

23. The computer readable medium of claim 18, wherein the step of examining data packets comprises at least one of:
scanning the data packets for dynamic host configuration protocol (DHCP) messages;
scanning the data packets for address resolution protocol (ARP) packets; and
scanning the data packets for DNS messages.

24. The computer readable medium of claim 19, wherein the step of sending a request comprises at least one of:
transmitting a DHCP message to at least one of the plurality of network devices;
transmitting a DNS message to at least one of the plurality of network devices; and
transmitting an internet control message protocol (ICMP) address mask request.

25. The computer readable medium of claim 18, further comprising:
storing the network parameters in a non-volatile memory.

26. An apparatus for configuring a router, comprising:
means for examining, in an un-configured non-routing-mode, data packets transparently passing through the router that are directed to one or more of a plurality of network devices other than the router for determining network parameters associated with the plurality of network devices, the network parameters being previously unknown to the router; and
means for adapting a plurality of network interfaces in the router to the network parameters for operatively coupling the router and the plurality of network devices.

* * * * *